(12) United States Patent
Kellogg et al.

(10) Patent No.: US 12,184,744 B1
(45) Date of Patent: Dec. 31, 2024

(54) CONTROLLING ACCESS IN MULTI-TENANT ENVIRONMENTS

(71) Applicant: SPLUNK INC., San Francisco, CA (US)

(72) Inventors: Christopher Kellogg, Palo Alto, CA (US); Pradeep Baliganapalli Nagaraju, Sunnyvale, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 17/958,082

(22) Filed: Sep. 30, 2022

(51) Int. Cl.
*H04L 67/562* (2022.01)
*G06F 21/62* (2013.01)

(52) U.S. Cl.
CPC ........ *H04L 67/562* (2022.05); *G06F 21/6218* (2013.01); *G06F 2221/2141* (2013.01)

(58) Field of Classification Search
None
See application file for complete search history.

(56) References Cited

U.S. PATENT DOCUMENTS

| | | |
|---|---|---|
| 7,937,344 B2 | 5/2011 | Baum et al. |
| 8,112,425 B2 | 2/2012 | Baum et al. |
| 8,751,529 B2 | 6/2014 | Zhang et al. |
| 8,788,525 B2 | 7/2014 | Neels et al. |
| 9,215,240 B2 | 12/2015 | Merza et al. |
| 9,286,413 B1 | 3/2016 | Coates et al. |
| 10,127,258 B2 | 11/2018 | Lamas et al. |
| 11,756,357 B2* | 9/2023 | Carter .................... B64U 50/39 |
| | | 348/155 |
| 2010/0107231 A1* | 4/2010 | Kavanagh ........... H04L 63/0892 |
| | | 714/48 |
| 2010/0202450 A1* | 8/2010 | Ansari ..................... G10L 15/22 |
| | | 370/389 |
| 2016/0134616 A1* | 5/2016 | Koushik ............. H04L 63/0428 |
| | | 726/9 |
| 2016/0248703 A1* | 8/2016 | Gopalakrishnan .... H04L 45/586 |
| 2018/0165386 A1* | 6/2018 | Soundiramourthy ........................ |
| | | H04L 67/562 |
| 2019/0098106 A1 | 3/2019 | Mungel et al. |
| 2020/0366631 A1* | 11/2020 | Hoffner .................. H04L 67/55 |
| 2022/0343411 A1* | 10/2022 | Waldrep ............... G06Q 50/165 |
| 2022/0394011 A1* | 12/2022 | Nakatsukasa ....... H04L 61/5014 |
| 2024/0004684 A1* | 1/2024 | Gupta ..................... G06F 9/546 |

OTHER PUBLICATIONS

Splunk Enterprise 8.0.0 Overview, available online, retrieved May 20, 2020 from docs.splunk.com.

(Continued)

*Primary Examiner* — Atta Khan
(74) *Attorney, Agent, or Firm* — Shook, Hardy & Bacon L.L.P.

(57) ABSTRACT

A process for providing requests to a management application in a multi-tenant environment is described herein. In embodiments, a broker client is deployed within a tenant execution environment executed by a server computer system. In embodiments, the broker client is configured to communicate with a broker responsible for managing the tenant execution environment based on configuration information. Furthermore, in various embodiments, request to perform operations associated with the tenant execution environment are transmitted to the broker client over a connection and the broker client provides the request to the broker for execution.

17 Claims, 7 Drawing Sheets

(56) References Cited

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

CONTROLLING ACCESS IN MULTI-TENANT ENVIRONMENTS

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that leverage large server computer systems to service a plurality of users simultaneously. These multi-tenant environments can execute a plurality of applications, store large amounts of data, analyze data, or otherwise perform operations directed by the users. This technological evolution can give rise to various challenges in relation to managing, understanding, and effectively utilizing these computing resources. In particular, managing permissions, maintaining security, and ensuring tenants have sufficient access to control and/or modify computing resources performing operations on behalf of the users can be challenging. For example, when a single computing resource and/or application can service a plurality of tenants, it can be difficult to securely ensure that tenants have an appropriate amount of access in order to manage execution of various tasks the tenant is attempting to perform.

BRIEF DESCRIPTION OF THE DRAWINGS

The present disclosure is illustrated by way of example, and not limitation, in the figures of the accompanying drawings, in which like reference numerals indicate similar elements.

DETAILED DESCRIPTION

Modern data centers and other server computer systems can comprise anywhere from a few host computer systems to thousands of systems configured to process data, service requests from remote clients, and perform numerous other computational tasks. During operation, various components within these server computer systems often provide computing environments as a consumable service, or otherwise provide access to computing resources, for a plurality of users, customers, accounts, and/or tenants. For example, a single server computer system can host a plurality of tenant execution environments within which client applications can be executed on behalf of corresponding customers, accounts, and/or tenants (where each customer, account, and/or tenant can include one or more users) using the underlying hardware of the server computer system. In addition, these tenant execution environments can be isolated from other environments to improve security and prevent unauthorized access. However, there may be situations where isolation prevents tenants from performing certain operations. For example, isolating the tenant execution environment may prevent the tenant from communicating with management applications (e.g., operating system, broker service, front end, etc.) executed by the server computer systems that are responsible for monitoring and/or managing various aspects of the tenant execution environment and/or applications executed within the tenant execution environment.

In addition, multiple users with the same or different privileges (e.g., access rights) may have access to a single tenant execution environment, applications executing within the tenant execution environment, and/or other components of the tenant execution environment and/or server computer system providing the tenant execution environment. Furthermore, certain operations and/or commands can only be executed with the appropriate privileges. For example, adding, modifying, and/or deleting components of the tenant execution environment may only be allowed when the tenant requesting the operations has the required permissions (e.g., admin privileges). This may make it difficult to administer the tenant execution environments and/or components thereof as a result of tenants not having the means to transmit commands to the management applications (e.g., as a result of isolation) or sufficient permissions to cause the management applications to execute operations (e.g., to ensure security and stability of the server computer systems and applications executed by server computer systems).

One example of a multi-tenant service that includes isolated tenant execution environments is APACHE PULSAR, which is a publication-subscription (pub-sub) messaging system that utilizes a broker as a management application to manage multiple tenant execution environments. In such examples, a tenant associated with a particular tenant execution environment (e.g., users with access to the particular tenant execution environment) and who wants to monitor, edit topic configurations for published or subscribed messages, or perform other admin operations cannot do so without logging into the management application (e.g., the broker in APACHE PULSAR environments). This is a result of the broker being associated with a service account that includes admin privileges. In various examples, the broker includes source code or other executable code that, as a result of being executed by one or more processors, causes the processors to perform various admin operations associated with isolated tenant execution environments such as creating, modifying, tearing down, monitoring or otherwise managing components of the isolated tenant execution environments. In examples such as these, the broker is a management application that, among other things, obtains and load balances incoming messages from producers, dispatches messages to consumers, communicates with a configuration store to handle various coordination tasks, stores messages in instances, exposes one or more application programming interfaces ("APIs") for administrative tasks and tasks associated with topics (e.g., API(s) that can be used to create, modify, tear down, or otherwise manage containers in a tenant's pod; obtain metrics such as a number of backlogged messages; perform stress tests), and/or provides a transmission control protocol (TCP) server for data transfers.

However, providing all users with access to the broker (e.g., via the service account or by providing admin privileges directly) will make the broker and/or tenant execution environments vulnerable to updates that can negatively impact use or access by other tenants as well as pose a security risk. For example, if a tenant uses the broker for testing administrative changes or other tests, this may potentially cause noisy neighbor issues. Furthermore, providing a large number of users access to the service account associated with the broker may create various operational inefficiencies in managing the service account. Lastly, in APACHE PULSAR environments, it may be impractical and/or impossible to install and/or maintain client applications (e.g., PULSAR clients or command line interface (CLI) tools) on local devices for each of the tenants in various scenarios (e.g., non-playground environments).

In various embodiments, to address these and other issues, a management hop proxy deployed in a tenant execution environment serves as an intermediary between local tenant devices and a management application (e.g., a PULSAR broker), such that tenants may use a local tenant device to connect to and make administrative changes to the management application through the management hop proxy without directly connecting to the management application. In some embodiments, the management hop proxy encapsulates a client application for the management application (e.g., a broker client, PULSAR CLI tools) so the client application need not be installed on the tenant's local device. More generally, a client application for a management application of a tenant execution environment (e.g., a broker client for a broker) may be deployed or otherwise instantiated within a tenant execution environment and configured with privileges to access and make administrative changes to the management application associated with the tenant execution environment. In this manner, the broker client operates as a local host and/or proxy to enable the tenant to access the management application remotely. As described in greater detail below, the broker client can be packaged within a management hop proxy that can be executed within the tenant execution environment. The management hop proxy may encapsulate and/or provide additional functions (e.g., a PULASR ISTIO) that facilitate communication with tenants, the broker client, the management application, and/or other services or components within the multi-tenant environment, including functions such as secret management (e.g., HASHICORP VAULT), traffic management, service monitoring, encrypted communication, load balancing, a service mesh (e.g., ISTIO) that provides one or more of these functions, and/or others. In an example implementation, the management hop proxy obtains permissions associated with the tenant and/or users (which may be encoded in one or more tokens). These permissions can then be used by the broker client to authorize various requests and/or operations. In another example, the management hop proxy includes a service mesh (e.g., a dedicated infrastructure layer) that provides security, networking, and/or communication channels to allow broker clients to communicate within the management application.

More specifically, in some embodiments, a deployable management hop proxy (e.g., that encapsulates a broker client, other applications, and/or executable code) is deployed in a tenant execution environment in a multi-tenant environment, and transmits commands to a management application for the tenant execution environment (e.g., a broker) on behalf of tenants. For example, the management hop proxy can be implemented as a distinct computing device, virtual machine, container, container of a pod, or a process or thread associated with a container, or using multiple-related containers. In certain embodiments, such as in a KUBERNETES deployment, each management hop proxy can be implemented as a separate container or pod. For example, one or more of the components of the management hop proxy can be implemented as different containers of a single pod (e.g., on a containerization platform such as DOCKERDOCKER), the one or more components of the management hop proxy can be implemented as different DOCKER containers managed by synchronization platforms such as KUBERNETES or SWARM. Accordingly, reference to a containerized management hop proxy can refer to the management hop proxy as being a single container or as one or more components of the management hop proxy being implemented as different, related containers or virtual machines.

Additionally or alternatively, the management hop proxy may be provided with a set of permissions to access the management application based on account information associated with a tenant, one or more users associated with the tenant, and/or a tenant execution environment. For example, permissions associated with an account may be obtained from a data store and encoded in a token provided to the management hop proxy. In an embodiment, when submitting a command to the management application, the broker client sends the token in association with the command, and the token is evaluated by the management application to determine whether the token includes sufficient permissions to execute the command. When deploying the management hop proxy within the tenant execution environment, in various embodiments, the management application or other component of the server computer system configures the management hop proxy to perform the various operations described in the present disclosure. For example, the management application may obtain an image of the management hop proxy and instantiate the management hop proxy based on the image. Additionally or alternatively, the management hop proxy may be provided permissions and/or tokens to enable access to various other components of the server computer system, data center, and/or computing resource service provider.

Once the management hop proxy is deployed, tenants, via a client device or other local computing device, may connect or otherwise communicate with the broker client encapsulated by the management hop proxy. In various examples, tenants operating client devices transmit commands to the broker client, which interacts with the management application on behalf of the tenants and returns a representation of responses or other results received from the management application back to the corresponding client devices. As described in more detail below, the broker client can perform various operations on behalf of the tenant, for example, the broker client can obtain metrics and statistical data associated with the tenant execution environment, modify components of the tenant execution environment, create components of the tenant execution environment, remove components of the tenant execution environment, or other operations. Depending on the implementation, the client device can connect to the management hop proxy using a variety of different techniques such as Secure Shell Protocol (SSH), port forwarding, and/or other protocol and/or techniques for communicating data over one or more networks. In various embodiments, the management hop proxy provides a computing resource which is local (e.g., on the same network, within the computing environment, local host, proxy, etc.) to the server computer systems and/or management application to securely and efficiently execute various commands (e.g., to facilitate management and monitoring of the tenant execution environment). In some embodiments, the management hop proxy delegates a subset of the admin functions and/or operations available to the management application (e.g., broker) to tenants based on permissions associated with the tenants without the need to grant admin privileges. Furthermore, in some embodiments, the management application, through the broker client, provides or otherwise exposes a control plane to tenants, allowing tenants to control various aspects of the tenant execution environment such as network traffic, gateways, diagnostics, extensions (e.g., connections to other systems and services), or other admin functions and/or operations.

Advantageously, various embodiments described herein provide tenants a streamlined process for communicating with management applications in a multi-tenant environment without exposing (or by minimizing or reducing the risk of exposing) isolated tenant execution environments to security risks. For example, providing a broker client within the tenant execution environment such that the broker client can communicate with the broker on behalf of tenants obviates the need to allow tenants to directly access a service account or other admin account associated with the broker. In addition, by providing the broker client with a token associated with the tenant, only those permissions assigned to the tenant are available for the broker client, preventing tenants from having more privileges than required and reducing the risk that tenants might negatively impact the ability of other tenants to use or access tenant execution environments (e.g., reducing the likelihood of noisy neighbor issues). In various embodiments, as a result of providing tenants with access to a remote broker client (e.g., an image that can be used to instantiate the broker client), the amount of source code and/or other executable code that the tenant must develop to perform various operations described herein is reduced or even eliminated entirely in some cases. These and other benefits will be appreciated by those of ordinary skill in the art.

2.0. Operating Environment

Figure 1:
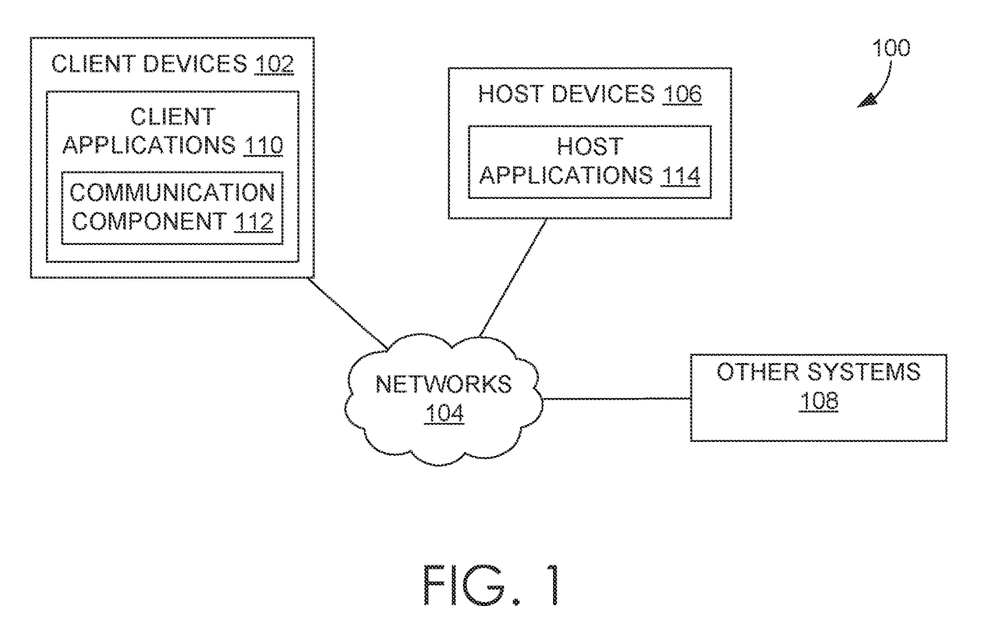
FIG. 1 is a block diagram of an example networked computer environment, in accordance with example embodiments.

FIG. 1 is a block diagram of an example networked computer environment 100, in accordance with example embodiments. It will be understood that FIG. 1 represents one example of a networked computer system and other embodiments may use different arrangements.

The networked computer environment 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and other systems 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, the networked computer environment 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, Hypertext Markup Language (HTML) documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a communication component 112. At a high level, the communication component 112 comprises a software component or other logic that facilitates the client device 102, through the client application 110, communicating with the host applications 114 and/or other systems 108. Communication component 112 may be an integrated component of a client application 110, a plug-in, an extension, or any other type of add-on component. Communication component 112 may also be a stand-alone process.

In some embodiments, a communication component 112 may be created when a client application 110 is developed, for example, by an application developer using a software development kit (SDK). The SDK may include custom code that can be incorporated into the code implementing a client application 110. When the code is converted to an executable application, the custom code implementing the communication functionality can become part of the application itself.

In some embodiments, an SDK or other code for implementing the communication functionality may be offered by a provider of host devices 106 and/or other systems 108. In such cases, these providers can implement the custom code so that data is transmitted by the communication functionality to host devices 106 and/or the system 108 to facilitate transmission of commands to be executed by the host applications or other component of the host devices 106 (e.g., analysis of the performance data by a developer of the client application or other users, modification of resources used to executed the host applications 114, etc.).

In some embodiments, the custom code may be incorporated into the code of a client application 110 in a number of different ways, such as the insertion of one or more lines in the client application code that call or otherwise invoke the communication component 112. As such, a developer of a client application 110 can add one or more lines of code into the client application 110 to trigger the communication component 112 at desired points during execution of the application. Code that triggers the communication component may be referred to as a trigger. For instance, a trigger may be included at or near the beginning of the executable code of the client application 110 such that the communication component 112 is initiated or triggered as the application is launched, or included at other points in the code that correspond to various actions of the client application, such as sending a network request or displaying a particular interface.

Upon developing a client application 110 that incorporates a communication component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

2.4. Other Systems

In one example, the other systems 108 can process and store data received data from the client devices 102 and/or host devices 106, execute queries on the data in response to requests received from one or more computing devices, provide services to the client devices 102 and/or host devices 106, or generally provide computing resources to one or more computing devices. In certain embodiments, the other systems 108 can include various components that enable it to provide stateless services or enable it to recover from an unavailable or unresponsive component without data loss in a time efficient manner. For example, the other systems 108 can store contextual information about its various components in a distributed way such that if one of the components becomes unresponsive or unavailable, the other systems 108 can replace the unavailable component with a different component and provide the replacement component with the contextual information. In this way, the other systems 108 can quickly recover from an unresponsive or unavailable component while reducing or eliminating the loss of data that was being processed by the unavailable component.

The other systems 108 can perform a variety of operations, for example, processing and storing data received from the data sources, executing queries on the data in response to requests received from the client devices 102, or otherwise provide computing resources for the client devices 102, host devices 106, or other computing devices. In some embodiments, the other systems 108 sends and receives requests or other data using an API, command line, SDK, web interface, protocol, or other method to send and receive data over the networks 104.

In some environments, a user of other systems 108 and/or host devices 106 may install and configure, on computing devices owned and operated by the user, one or more software applications that implement some or all of these system components. For example, a user may install a software application on server computers owned by the user and configure each server to operate as one or more of described herein. This arrangement generally may be referred to as an "on-premises" solution. That is, the other systems 108 are installed and operate on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of other systems 108 operate.

In certain embodiments, one or more of the components of the other systems 108 and/or host devices 106 can be implemented in a remote distributed computing system. In this context, a remote distributed computing system or cloud-based service can refer to a service hosted by one more computing resources that are accessible to end users over a network, for example, by using a web browser or other application on a client device to interface with the remote computing resources. For example, a service provider may provide the other systems 108 by managing computing resources configured to implement various aspects of the system and by providing access to the system to end users via a network. Typically, a user may pay a subscription or other fee to use such a service. Each subscribing user of the cloud-based service may be provided with an account that enables the user to configure a customized cloud-based system based on the user's preferences. When implemented as a cloud-based service, various components of the other systems 108 and/or host devices 106 can be implemented using containerization or operating-system-level virtualization, or other virtualization techniques. For example, one or more components of the host applications 114 can be implemented as separate software containers or container instances. Each container instance can have certain resources (e.g., memory, processor, etc.) of the underlying host computing system assigned to it, but may share the same operating system and may use the operating system's system call interface. Each container may provide an isolated execution environment on the host system, such as by providing a memory space of the host system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

In various embodiments, the networked computer environment 100 includes a hosted computing environment which may include one or more rapidly provisioned and released computing resources, which computing resources may include computing, networking and/or storage devices. A hosted computing environment may also be referred to as a cloud computing environment. Accordingly, the hosted computing environment can include any proprietary or open source extensible computing technology, such as APACHE FLINK or APACHE SPARK, to enable fast or on-demand horizontal compute capacity scaling of the other systems 108 and/or host application(s) 114.

3.1. Multi-Tenant Environment

Figure 2:
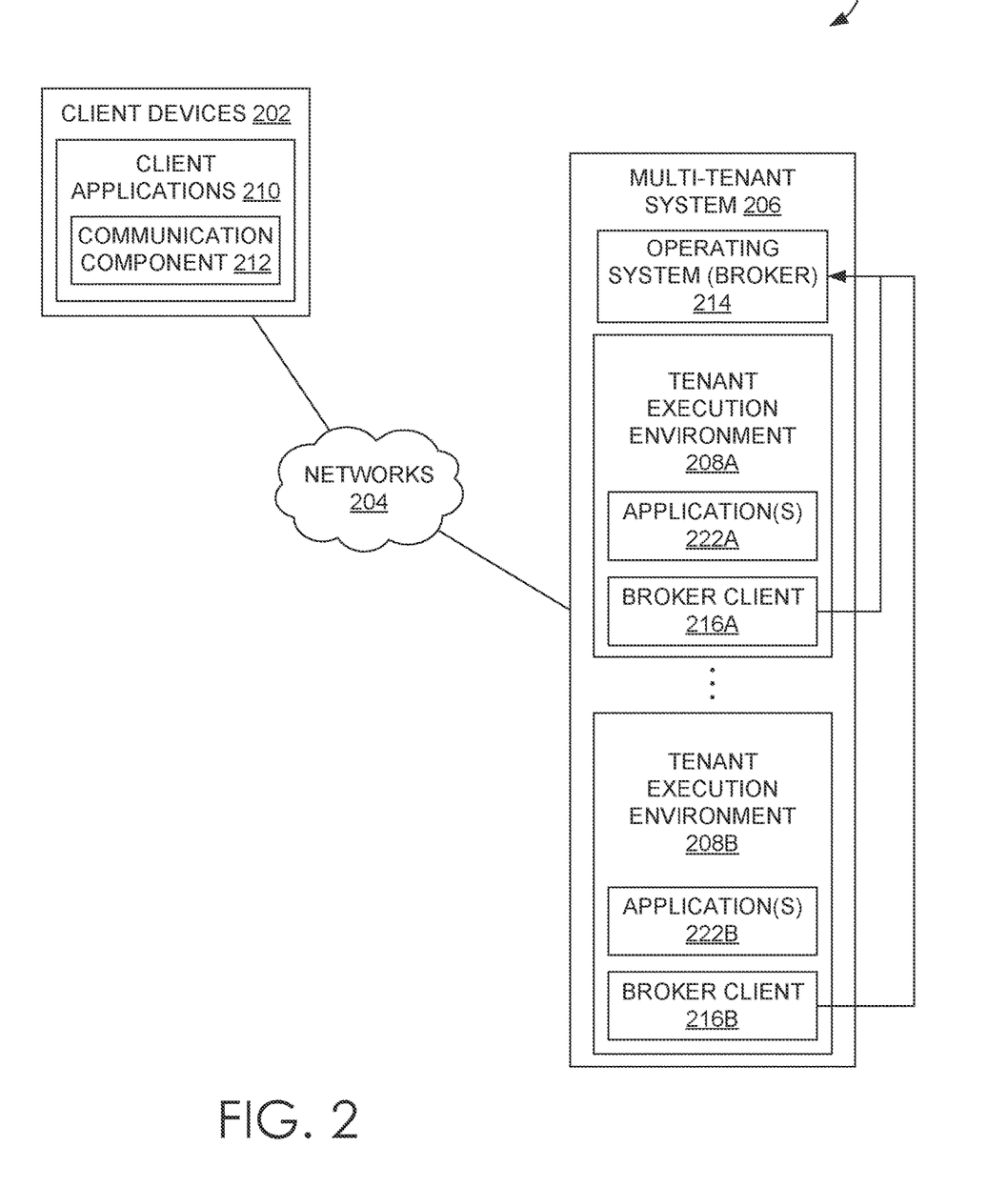
FIG. 2 is a block diagram of an example multi-tenant system, in accordance with example embodiments.

FIG. 2 is a block diagram of an embodiment of multi-tenant environment 200. In the illustrated embodiment, the multi-tenant environment 200 includes client devices 202 in communication with a multi-tenant system 206 via networks 204 respectively. The networks 204 may be the same network, may correspond to the network 104, or may be different networks. Further, the networks 204 may be implemented as one or more LANs, WANs, cellular networks, intranetworks, and/or internetworks using any of wired, wireless, terrestrial microwave, satellite links, etc., and may include the Internet. The multi-tenant system 206, in various embodiments, include hardware and/or software configured to provide computing resources to perform the operations described herein. For example, the multi-tenant system 206 includes one or more server computer systems of a data center.

In the illustrated embodiment, the multi-tenant system 206 includes one or more tenant execution environments 208A and 208B (collectively or individually referred to as tenant execution environments 208), one or more applications 222A and 222B (collectively or individually referred to as applications 222), one or more broker clients 216A and 216B (collectively or individually referred to as broker clients 216), and an operating system (e.g., which may include a management application or operating system components such as a broker) 214 (also referred to as simply broker 214). However, it will be understood that the multi-tenant system 206 can include fewer or more components as desired.

In one embodiment, the client devices 202 can be implemented using one or more computing devices in communication with the multi-tenant system 206 using a communication component 212, and represents some of the different ways in which computing devices can transmit commands to a broker client 216. For example, the client device 202 can communicate, using the communication component 212, over an Internet (Web) protocol with the multi-tenant system 206, via a command line interface, and/or via a software developer kit (SDK). However, it will be understood that the client devices 202 can communicate with and submit commands to the multi-tenant system 206 in a variety of ways. In addition, the client device 202 may execute client applications 210 which may be the same as client applications 110 of FIG. 1.

In various embodiments, application(s) 222 may be user applications, components of user applications, or other applications executed at least in part in a tenant execution environment 208. For example, the application(s) 222 include user applications including source code or other executable instructions executed or otherwise implemented using containerization or operating-system-level virtualization, or other virtualization techniques. For example, the tenant execution environment 208 includes a container managed by the operating system 214 (e.g., a broker) and the application(s) 222 include a process or thread associated with the container. In some embodiments, the tenant execution environment 208, applications 222, and/or a broker client 216 can be implemented as a distinct computing device, virtual machine, container, container of a pod, or a process or thread associated with a container, or using multiple-related containers.

In certain embodiments, such as in a KUBERNETES deployment, each tenant execution environment 208A and 208B can be implemented as a separate container or pod. For example, one or more of the components of the tenant execution environment 208 can be implemented as different containers of a single pod, e.g., on a containerization platform, such as DOCKER, the one or more components of the tenant execution environment can be implemented as different DOCKER containers managed by synchronization platforms such as KUBERNETES or SWARM. Accordingly, references to a containerized tenant execution environment 208 can refer to the tenant execution environment 208 as being a single container or as one or more components of tenant execution environment 208 being implemented as different, related containers or virtual machines. As a result, in various embodiments, the tenant execution environments 208 are logically isolated from other components of the multi-tenant system 206.

As described in more detail below, the client applications 210, via the communication component 212, may transmit commands to the tenant execution environment 208 and/or broker client 216 to cause various operations to be performed. For example, the client application 210 can obtain various metrics or other data obtained by the operating system 214. In another example, the client application 210 transmits a command to the broker client 216A to modify the tenant execution environment 208A or component thereof. In various embodiments, the broker client 216 provides tenants with a local host or similar method for communicating with the operating system 214 or component thereof that may be logically isolated from the tenant execution environment 208. In some embodiments, the broker client 216 may include permissions (e.g., encoded as tokens) for accessing and/or obtaining data from various components of the operating system 214. For example, as described in greater detail below in connection with FIG. 4, the broker client 216A obtains a token which, when provided with a command and/or request to the operating systems, indicates permissions associated with a tenant associated with the tenant execution environment 208A. In such examples, the operating system 214 evaluates the permissions encoded in the token before processing the request. Furthermore, although the broker client 216 is illustrated as an individual component within the tenant execution environment 208, in various other embodiments (e.g., FIG. 3), the broker client 216 may be a component (e.g., container, thread, process, etc.) of another component of the tenant execution environment. For example, the broker client 216 can be a component of an management hop proxy

3.2 Tenant Execution Environment

Figure 3:
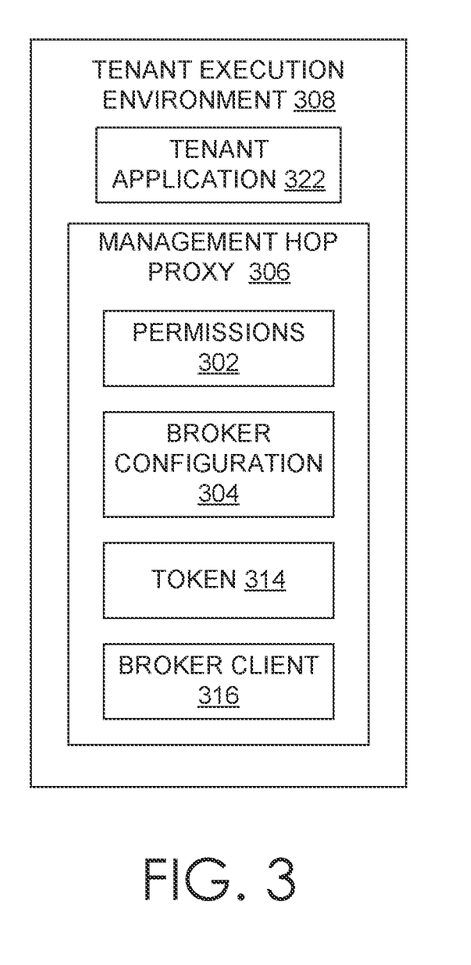
FIG. 3 is a block diagram of one embodiment of a tenant execution environment, in accordance with example embodiments.

FIG. 3 is a block diagram of an embodiment of tenant execution environment 308. The tenant execution environment 308 may correspond to the tenant execution environment 208 of FIG. 2. In an embodiment, the tenant execution environment 308 includes a set of computing resources used to execute a tenant application 322 and a management hop proxy 306. For example, the tenant execution environment 308 includes one or more computing devices with memory and processors to execute source code or other executable instructions associated with the tenant application 322 and the management hop proxy 306. In an embodiment, the tenant execution environment 308 is at least partially supported and/or implemented using virtualization or paravirtualization. For example, the tenant execution environment 308 includes a container, as described above, to provide a logically isolated environment to execute the tenant application 322 and the management hop proxy 306. In various embodiments, the management hop proxy 306 includes or is implemented by a pod, and/or the broker client 316 includes a container executing within the management hop proxy 306 (e.g., the pod).

The tenant application 322, in various embodiments, corresponds to applications 222 described above. In an embodiment, the management hop proxy 306 may be a container, container of a pod, process, thread, or other component of a container and/or virtual machine. Furthermore, the management hop proxy 306, as illustrated in this embodiment, includes permissions 302, broker configuration 304, token 314, and broker client 316. In various embodiments, communication with a management application or other component responsible for creating and managing the tenant execution environment 308 may be limited. In such embodiments, the management hop proxy 306 is provided with permissions 302 to communicate with the management application (e.g., broker). In addition, in various embodiments, the permissions 302 include tenant permissions and/or account permissions associated with a tenant of the tenant execution environment 308. For example, in a multi-tenant environment, tenants are associated with one or more accounts of a computing resource service provider and the tenants are provided a set of permissions allowing access to particular computing resources provided by the computing resource service provider. In an embodiment, during initialization of the management hop proxy 306, the permissions 302 are obtained from a data store and/or one or more services. For example, as described below in connection with FIG. 4, a service may maintain tenant permissions associated with accounts in a data store, and when the management hop proxy is initialized, an operating system or other management application initializing the management hop proxy 306 obtains the permissions associated with the tenant from the data store.

Furthermore, in one embodiment, the permissions 302 include permissions to obtain additional data used to complete initialization of the management hop proxy 306. For example, the permissions 302 encode a permission to enable the management hop proxy 306 to obtain token 314, broker configuration 304, and/or broker client 316. The broker configuration 304, in an embodiment, includes information indicating one or more settings of the management application (e.g., broker) to enable the broker client 316 to communicate with the management application. For example the broker configuration 304 includes information to enable the broker client 316 to communicate (e.g., transmit request) with the broker responsible for managing the tenant execution environment 308.

In an embodiment, the token 314 encodes permissions (which may include the permissions 302) to enable access to the management application. For example, the token 314 encodes a set of permissions indicating permissible operations that a tenant associated with the token 314 and/or management hop proxy 306 can have executed by the management application. In particular, the token 314, when submitted with a request by the broker client 316, can be evaluated by the management application to determine if the request is permissible and therefore can be processed by the management application. For example, a tenant connects to the broker client 316 and transmits a request to modify the tenant execution environment 308, in response, the broker client 316 generates a request to the management application including the token 314 to modify the tenant execution environment 308. In this example, the management application evaluates the token 314 to determine if the token 314 indicates the tenant has sufficient permission to perform the requested operation.

In various embodiments, the broker client 316 corresponds to the broker client 216 of FIG. 2. For example, the broker client 316 includes an application or other executable code that enables tenants to communicate with the management application associated with the tenant execution environment 308. In an embodiment, tenants can utilize the broker client 316 to perform various operations associated with the tenant execution environment 308 and/or a component thereof, including operations such as performing various tests (e.g., stress tests of the tenant application 322, the tenant execution environment 308, a cluster of devices or components such as a PULSAR cluster, some component thereof), obtaining metrics (e.g., backlog information, response time, etc.), configuring the tenant execution environment 308, or other operations associated with the tenant application 322, tenant execution environment 308, or other computing resources managed by the management application.

3.3 Computing Resource Service Provider

Figure 4:
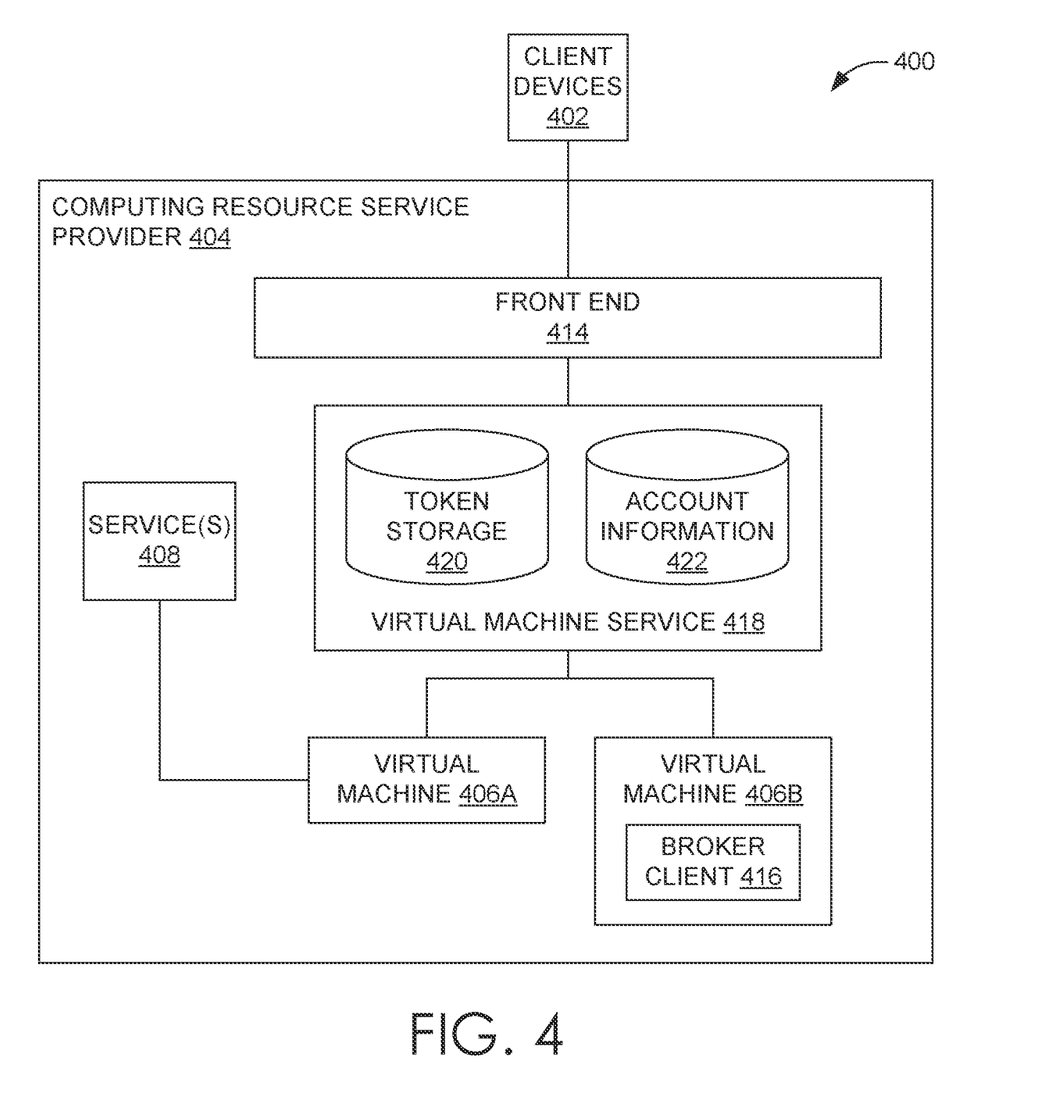
FIG. 4 is a block diagram illustrating an embodiment of a computing resource service provider, in accordance with example embodiments.

FIG. 4 is a block diagram of an embodiment of computing resource service provider environment 400. In an embodiment, client devices 402 communicates with a computing resource service provider 404 through a front end 414. The client devices 402 may corresponds to client devices 102 of FIG. 1. The client devices 402, in an example, are operated by users of the computing resource service provider 404 and communicate with various components of the computing resource service provider environment 400 to perform various operations described herein. In an embodiment, the client devices 402 transmit requests to the front end 414 to perform the various operations. The front end 414, in various embodiments, includes one or more computing resources that receive requests from client devices 402 and provide the requests to the corresponding service(s) 408 of the computing resource service provider 404. For example, the front end 414 obtains requests from the client device 402 and determines a corresponding back end (e.g., service back end) to process that request. In an embodiment, the client devices 402 transmits a request directed to the broker client 416, the request is obtained by the front end 414 and the front end 414 provides the request to the broker client 416 and/or a particular service (e.g., virtual machine service 418 or container service) that provides the request to the broker client 416.

The computing resource service provider 404 provides the client devices 402 with access to computing resources through service(s) 408 including a virtual machine service 418. In the embodiment illustrated in FIG. 4, the virtual machine service 418 includes a token storage 420 and account information 422. However, the virtual machine service 418 may include additional components other than illustrated in FIG. 4. In addition, the token storage 420 and account information 422, in various other embodiments, can be hosted by other services (e.g., service(s) 408) within the computing resource service provider 404 or other service providers. The service(s) 408 can include a plurality of services such as a data storage service, stream processing service, compute service, data processing service, or other services. For example, a service can include a data storage service that maintains an image of the broker client 416 and/or virtual machine 406 that is used to instantiate the broker client 416 and/or virtual machine 406. In an embodiment, the virtual machine service 418 provides virtual machines 406A and 406B (collectively or individually referred to as virtual machines 406) to tenants. The virtual machines 406, for example, can be executed using a server computer system such as server computer system 514 of FIG. 5 described below. Furthermore, the virtual machines 406 may include physical components, containers, or other computing resources.

In an embodiment, the account information 422 stores permissions and other information associated with client device 402 and/or tenants. For example, the account information 422 includes permissions associated with a tenant and computing resources (e.g., storage location, virtual machines, etc.) associated with the tenant. In various embodiments, the account information 422 is maintained by a separate service from the virtual machine service 418. In addition, the toke storage 420, in an embodiment, stores tokens such as the token 314 described above in connection with FIG. 3. Similarly, the token storage 420 may be provided by another service. Furthermore, in an embodiment, the token storage 420 contains one or more types of tokens. For example, the token storage 420 can include identity and authentication tokens as well as tokens encoding permissions (e.g., permissions associated with a particular tenant and/or client device 402).

As described above in connection with FIG. 4, the broker client 416 may be executed within a tenant execution environment (illustrated in FIG. 4 as virtual machine 406B) and may be provided account information and a token. For example, when provisioning the virtual machine 406B, the virtual machine service 418 obtains permissions from the account information and a token from the token storage to provide to the broker client 416B and virtual machine 406B.

In an embodiment, the client devices 402 provide information indicating a tenant and/or account associated with a request and/or requested broker client 416. For example, a user, via the user devices 402, transmits a request to deploy the broker client 416 within the virtual machine 406B indicating an account to be associated with the broker client 416. In this example, once the front end 414 has directed the request to the virtual machine service 418, the virtual machine service 418 obtains the account information and token based on the account provided by the tenant. Furthermore, in various embodiments, the tenant and/or account is authenticated to avoid unauthorized access.

3.4 Server Computer System

Figure 5:
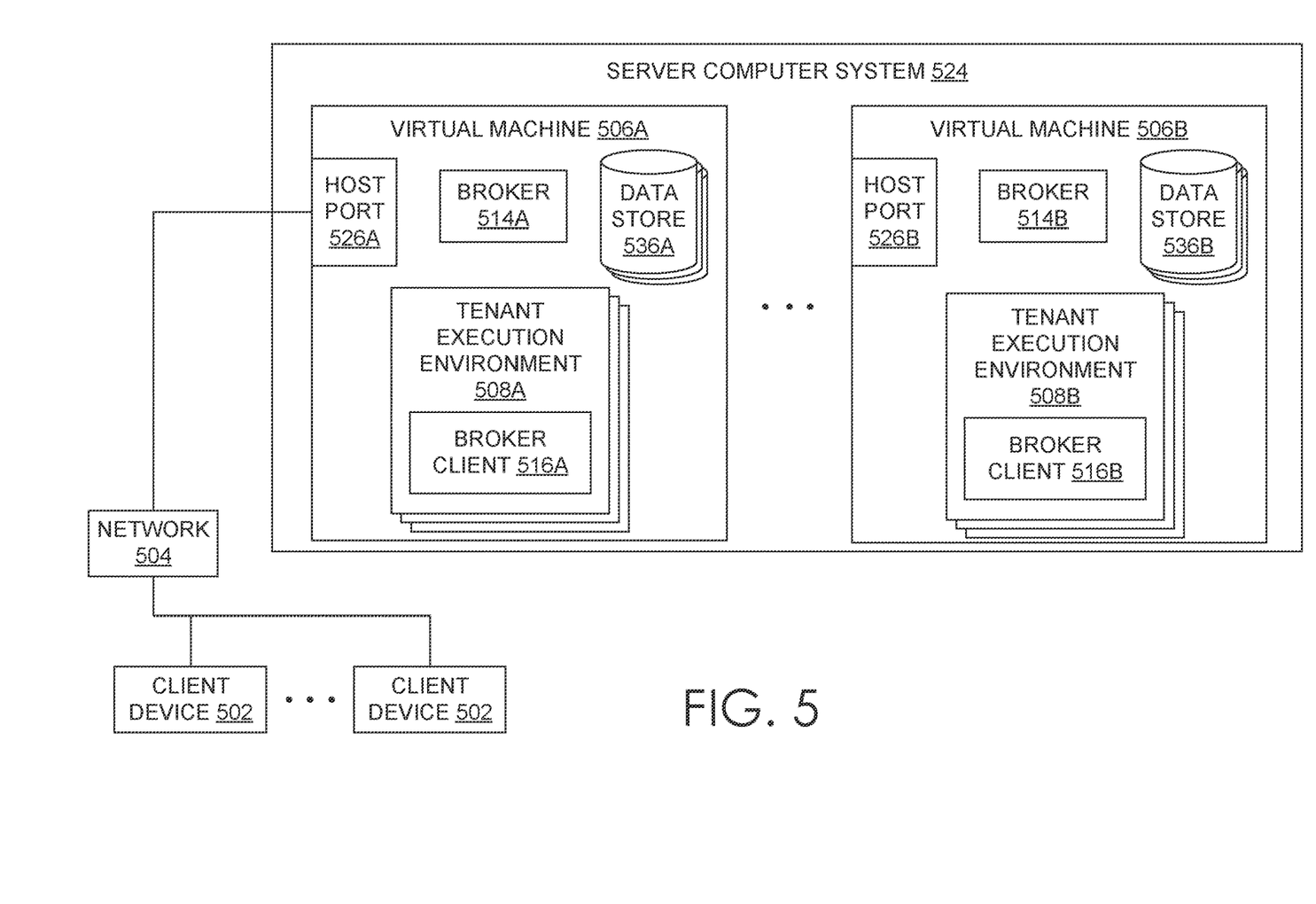
FIG. 5 is a block diagram illustrating an embodiment of a server computer system implementing a tenant execution environment, in accordance with example embodiments.

FIG. 5 is a block diagram illustrating an embodiment of a broker client 516 of the server computer system 524. The broker client 516 can receive, process, and execute requests from multiple client devices 502, which may be associated with different tenants, users, etc. In addition, each tenant execution environment (e.g., tenant execution environment 508A and 508B), in an embodiment, is associated with a single tenant (e.g., account) but may be accessible to a plurality of users (e.g., developer, quality assurance, security engineer, etc.). Moreover, the broker client 516 can include various components that enable it to provide requests obtained from the client devices 502 over the network 504 for the broker 514.

In the illustrated embodiment, the server computer system 524 includes one or more virtual machines 506A and 506B (collectively or individually referred to as virtual machines 506), one or more host ports 526A and 536B (collectively or individually referred to as host ports 526), one or more brokers 514A and 514B (collectively or individually referred to as broker 514 or brokers 514), one or more tenant execution environments 508A and 508B (collectively or individually referred to as tenant execution environment 508 or tenant execution environments 508), one or more brokers clients 516A and 516B (collectively or individually referred to as broker client 516 or broker clients 516), and one or more data stores 536A and 536B (collectively or individually referred to as data store 536 or data stores 536). However, it will be understood that the server computer system 524 can include fewer or more components as desired. For example, in some embodiments, a token storage, accounting information storage, virtual machine image storage can form part of the server computer system 524, etc.

As described herein, each of the components of the server computer system 524 can be implemented using one or more computing devices as distinct computing devices or as one or more container instances or virtual machines across one or more computing devices. For example, in some embodiments, the tenant execution environments 508, broker clients 516, brokers 514, and data stores 536 can be implemented as distinct computing devices with separate hardware, memory, and processors. In certain embodiments, the tenant execution environments 508, broker clients 516, brokers 514, and data stores 536 can be implemented on the same or across different computing devices as distinct container instances, with each container having access to a subset of the resources of a host computing device (e.g., a subset of the memory or processing time of the processors of the host computing device), but sharing a similar operating system. In some cases, the components can be implemented as distinct virtual machines across one or more computing devices, where each virtual machine can have its own unshared operating system but shares the underlying hardware with other virtual machines on the same host computing device.

Although shown as residing on the same machine, some or all of the components illustrated in FIG. 5 may be distributed across multiple machines in any combination. It will be appreciated by those skilled in the art that the server computer system 524 may have more of fewer components than are illustrated in FIG. 5. In addition, the server computer system 524 could include and/or implement various web services and/or peer-to-peer network configurations or inter container communication network provided by an associated container instantiation or orchestration platform (such as the virtual machine service 418 described above in connection with FIG. 4). Thus, the server computer system 524 should be taken as illustrative. In certain embodiments, the virtual machines 506 and/or brokers 514 can be implemented using KUBERNETES or SWARM.

In an embodiment, each virtual machine 506 includes the broker 514 that is configured to manage the tenant execution environment 508 and store and retrieve data from the data stores 536. While the present disclosure describes the server computer system 524 as including one or more virtual machines 506, this is not meant to be limiting. For example, alternatively or in addition to including one or more virtual machines 506, the server computer system 524 can include one or more distinct computing devices, one or more containers, one or more containers of one or more pods, and/or one or more processes or threads associated with one or more containers. A distinct computing device, container, container of a pod, process, thread, etc. may perform the same or similar functionality as a virtual machine 506 described herein. For example, the broker client 516A can be implemented as a pod within the tenant execution environment 508.

In addition, some or all virtual machines 506, tenant execution environments 508, and/or broker clients 516 may be bound to host ports 526. When bound to host ports 526, the virtual machines 506, tenant execution environments 508, and/or broker clients 516 may be accessible via a public IP address. In an embodiment, the virtual machines 506, tenant execution environments 508, and/or broker clients 516 can be permanently bound to host ports 526 or can be temporarily bound to host ports 526. Thus, broker client 516A may always be bound to host port 526A or may be bound to host port 526A during certain times and not bound to the host port 526A during other time periods. For example, the broker client 516A is only bound to the host port 526A after a request to deploy the broker client 516A in tenant execution environment 508A is received by the server computer system 524.

3.5 Broker Client Deployment

Figure 6:
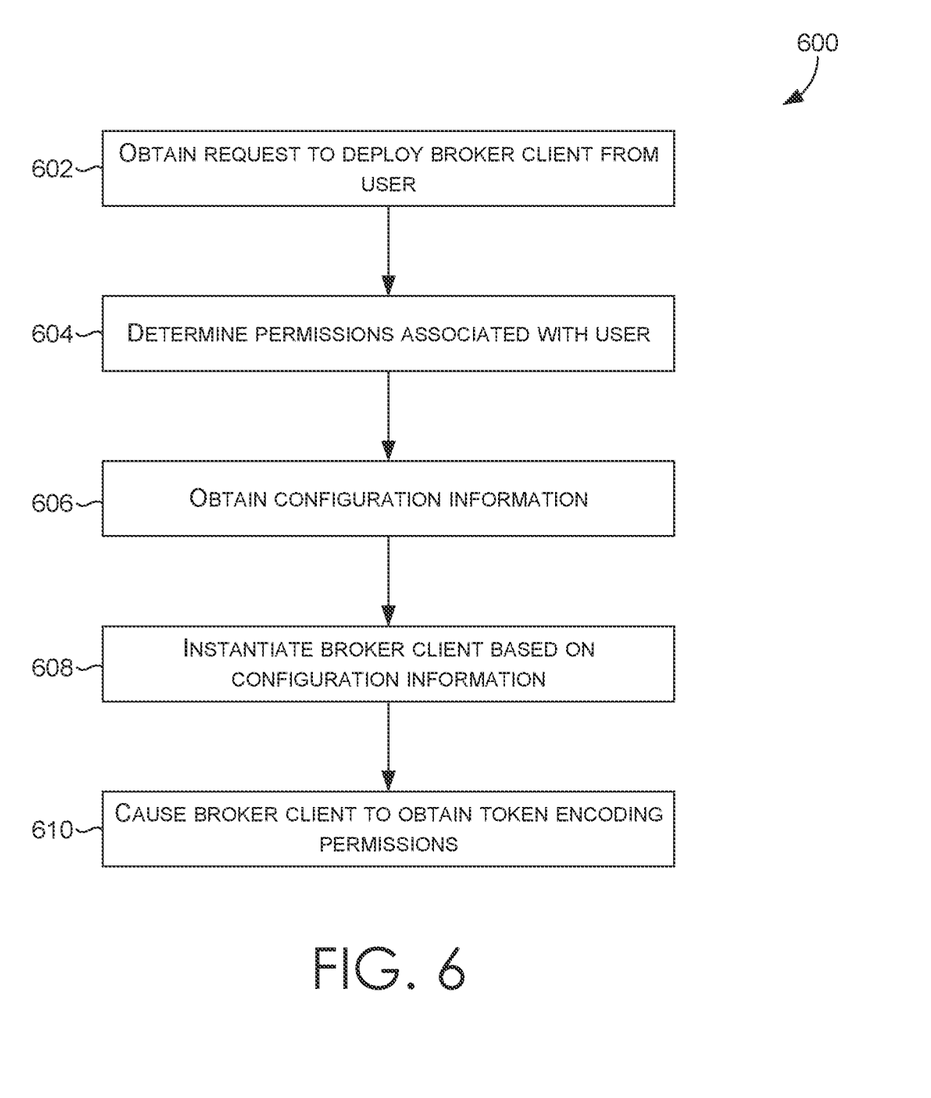
FIG. 6 is a flow diagram depicting illustrative interactions for instantiating a broker client, in accordance with example embodiments.

With reference to FIG. 6, an illustrative process, algorithm, or routine 600 for deploying a broker client 216 of FIG. 2 within the tenant execution environment 208 will be described in the form of a flowchart. The routine begins at block 602, where a system (e.g., server computer system) executing the tenant execution environment 208 obtains a request to deploy the broker client 216 of FIG. 2. As noted above, the broker client 216 enables tenants to communicate with a broker or other management application associated with the tenant execution environment 208.

At block 604, the system executing the routine 600 determines permissions associated with the tenant. In an embodiment, the permissions are associated with a tenant and/or account indicated in the request. At block 606, the system executing the routine 600 obtains configuration information. For example, the configuration information indicates the broker and/or other management application associated with the tenant execution environment 208 and how to communicate with the broker and/or other management application. In another example, the configuration information indicates an image of the broker client 216 to instantiate. Furthermore, the configuration information may be stored in a structured file format such as JavaScript Object Notation (JSON), Extensible Markup Language (XML), YAML, etc. In an embodiment, some or all of the configuration information is generated in response to the request. For example, account information, permissions, identifying information, source code location, user information, or other information is obtained and used to generate the configuration information.

At block 608, the system executing the routine 600 instantiates the broker client 216 based on the configuration information. For example, an image and/or executable code associated with the broker client 216 is obtained and executed using one or more computing devices. In an embodiment, a virtual machine service and/or management application instantiates the broker client 216. At block 610, the system executing the routine 600 causes the broker client 216 to obtain a token encoding permissions. As noted above, when submitting requests to the broker 214, the broker client 216 may include a token indicating whether the request submitted by the broker client 216 is permissible.

3.6 Request Processing

Figure 7:
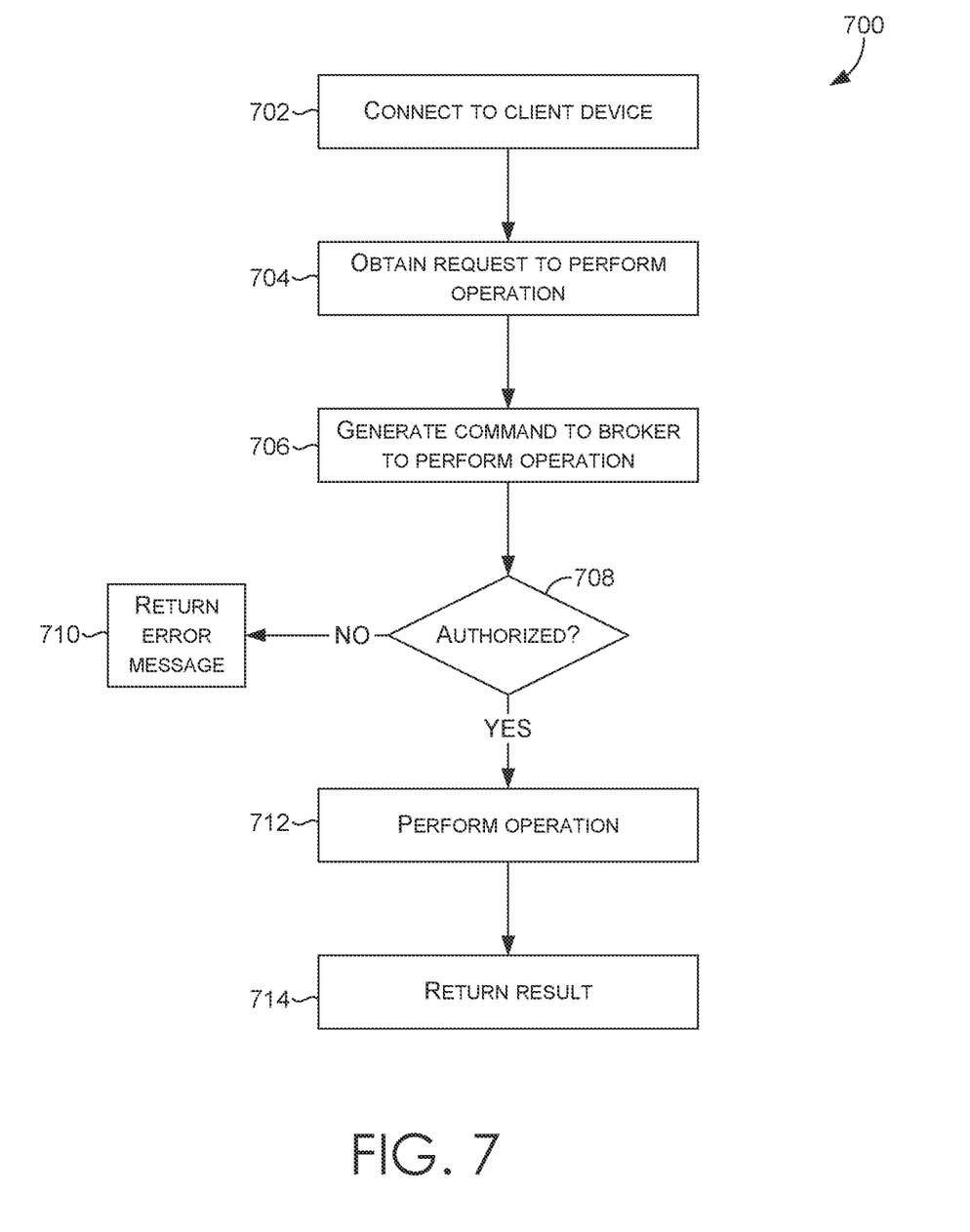
FIG. 7 is a flowchart depicting an illustrative routine for processing request from tenants, according to example embodiments.

With reference to FIG. 7, an illustrative process, algorithm, or routine 700 for processing request at the broker 214 of FIG. 2 obtained from the broker client 216 of FIG. 2 will be described in the form of a flowchart. The routine begins at block 702, where the broker client connects to the client device. As noted above, the client device can transmit commands to the broker client using various techniques such as those that use a command line, SDK, API, local host, and/or other techniques.

At block 704, the system executing the routine 700 obtains a request to perform an operation. For example, a user, through the client device, submits a request to perform an operation associated with a tenant execution environment such as modifying the tenant execution environment, performing a test of the tenant execution environment, obtaining metrics associated with the tenant execution environment etc. At block 706, the system executing the routine 700 generates a command to the broker to perform the operation. For example, the broker client generates a command to the broker based on the request obtained from the client device. In an embodiment, generating the command includes forwarding the request from the client device to the broker. In other embodiments, generating the command includes additional processing of the request and including a token with the command as noted above.

At block 708, the system executing the routine 700 determines if the command is authorized. For example, the broker evaluates the token to determine whether the operation is allowed to be performed by the tenant or whether the tenant is authorized to perform operations associated with the tenant execution environment. In another example, the broker determines whether the operation is authorized with the tenant execution environment. If the operation is not authorized, the routine 700 continues to block 710. At block 710, the system executing the routine 700 returns an error message. For example, the broker returns an error message to the broker client indicating the operation is not authorized. However, if the system executing the routine 700 determines the operation is authorized, the routine 700 continues to block 712.

At block 712, the system executing the routine 700 performs the operation. As noted above, the broker manages the tenant execution environment and executes the operation associated with the tenant execution environment. For example, the broker obtains metrics associated with the tenant execution environment or component thereof from a data store. At block 714, the system executing the routine 700 returns the result. Returning to the example above, the broker 214 returns the metrics requested in the command to the broker client 216. Furthermore, the broker client 216 may return the results to the client device over the connection.

4.0 Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. In certain embodiments, one or more of the components of the multi-tenant system 206 can be implemented in a remote distributed computing system. In this context, a remote distributed computing system or cloud-based service can refer to a service hosted by one or more computing resources that are accessible to end users over a network, for example, by using a web browser or other application on a client device to interface with the remote computing resources. For example, a service provider may provide the multi-tenant system 206 by managing computing resources configured to implement various aspects of the system (e.g., tenant execution environment 208, operating system 214, broker client 216 etc.) and by providing access to the system to end users via a network.

When implemented as a cloud-based service, various components of the multi-tenant system 206 can be implemented using containerization or operating-system-level virtualization, or other virtualization techniques. For example, one or more components of the multi-tenant system 206 (e.g., tenant execution environment 208, operating system 214, broker client 216, etc.) can be implemented as separate software containers or container instances. Each container instance can have certain resources (e.g., memory, processor, etc.) of the underlying host computing system assigned to it, but may share the same operating system and may use the operating system's system call interface. Each container may provide an isolated execution environment on the host system, such as by providing a memory space of the host system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application, in either this application or in a continuing application.

What is claimed is:

1. A computer-implemented method comprising:
    obtaining a request to instantiate an instance of a broker client within a tenant execution environment, the tenant execution environment managed by a broker executed by a server computer system;
    determining a set of permissions and configuration information associated with the tenant execution environment;
    instantiating the instance of the broker client within the tenant execution environment based on the configuration information, wherein a management hop proxy is instantiated in the tenant execution environment and encapsulates the broker client to enable access between the broker client within the tenant execution environment and the broker responsible for managing the tenant execution environment;
    causing the instance of the broker client to obtain a token encoding the set of permissions;
    obtaining, from a client device and at the instance of the broker client, a request to perform an operation associated with a component of the tenant execution environment; and
    causing the instance of the broker client to provide the request through the management hop proxy, including the token, to the broker, wherein the management hop proxy provides the request to the broker based on a second set of permissions associated with an account of the tenant execution environment.

2. The computer-implemented method of claim 1, wherein the request is obtained at a host port associated with the tenant execution environment and the broker and the broker client are within the same computing environment.

3. The computer-implemented method of claim 1, further comprising obtaining, from the broker by the broker client, an indication that the request cannot be processed based on the token not including sufficient permissions.

4. The computer-implemented method of claim 1, wherein the set of permissions are associated with a second account of the tenant execution environment.

5. The computer-implemented method of claim 1, wherein the set of permissions are associated with a tenant associated with the tenant execution environment.

6. The computer-implemented method of claim 1, wherein instantiating the instance of the broker client further comprises obtaining an image of the broker client maintained by a computing resource service provider providing the tenant execution environment.

7. The computer-implemented method of claim 6, wherein the computing resource service provider hosts a plurality of other tenant execution environments.

8. The computer-implemented method of claim 7, wherein the tenant execution environment is logically isolated from the broker and the plurality of other tenant execution environments.

9. The computer-implemented method of claim 1, wherein causing the instance of the broker client to provide the request to the broker causes the broker to modify the component of the tenant execution environment in response to the request.

10. The computer-implemented method of claim 1, further comprising configuring the broker client to communicate with the broker based on the configuration information.

11. The computer-implemented method of claim 1, wherein the operation includes at least one operation of: providing metrics associated with the tenant execution environment, testing the component of the tenant execution environment, modifying the component of the tenant execution environment, or adding an additional component to the tenant execution environment.

12. Non-transitory computer-readable media including computer-executable instructions that, when executed by a computing system, cause the computing system to perform operations comprising:

obtain, over a network connection, a request from a client device to perform a management operation associated with a tenant execution environment executed by a server computer system, the tenant execution environment isolated from at least one other tenant execution environment;

cause a broker client within the tenant execution environment to generate, in response to the request, a corresponding command to an operating system responsible for managing the tenant execution environment and the at least one other tenant execution environment, the command including a token indicating a set of permissions associated with the tenant execution environment;

cause a management hop proxy to be instantiated by the server computer system within the at least one other tenant execution environment, where the management hop proxy has sufficient permissions to communicate with the broker client and the operating system;

provide, by the broker client, the command to the operating system on behalf of the client device by at least encapsulating the command by the management hop proxy to enable the broker client to communicate with the operating system, thereby causing the operating system to execute the management operation; and provide, from the management hop proxy over the network connection to the client device, a result of the command obtained from the operating system.

13. The non-transitory computer-readable media of claim 12, the operations further comprising obtaining the token from an authentication service based on an account associated with the tenant execution environment.

14. The non-transitory computer-readable media of claim 12, the operations further comprising deploying the broker client with the tenant execution environment based at least in part on configuration information associated with the operating system.

15. The non-transitory computer-readable media of claim 12, wherein the result indicates that the command is not authorized based on the token.

16. The non-transitory computer-readable media of claim 12, wherein the operating system is a broker.

17. The computer-implemented method of claim 1, wherein the second set of permissions are associated with an operating system of the tenant execution environment.

* * * * *